United States Patent
Park et al.

(10) Patent No.: US 9,773,114 B2
(45) Date of Patent: Sep. 26, 2017

(54) METHOD FOR ANALYSING PROGRAM CODE OF ELECTRONIC DEVICE AND ELECTRONIC DEVICE

(71) Applicants: Samsung Electronics Co., Ltd., Suwon-si (KR); Seoul National University R&DB Foundation, Seoul (KR)

(72) Inventors: Ji-soon Park, Seoul (KR); Dongok Kang, Seoul (KR); Jeehoon Kang, Seoul (KR); Yong-ho Hwang, Seoul (KR); Kwangkeun Yi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 12 days.

(21) Appl. No.: 14/694,459

(22) Filed: Apr. 23, 2015

(65) Prior Publication Data

US 2015/0310207 A1    Oct. 29, 2015

(30) Foreign Application Priority Data

Apr. 23, 2014    (KR) ........................ 10-2014-0048925

(51) Int. Cl.
*G06F 12/14* (2006.01)
*G06F 21/56* (2013.01)

(52) U.S. Cl.
CPC ................................. *G06F 21/562* (2013.01)

(58) Field of Classification Search
CPC ..................................................... G06F 21/562
See application file for complete search history.

(56) References Cited

U.S. PATENT DOCUMENTS

| | | | | |
|---|---|---|---|---|
| 5,758,353 A | * | 5/1998 | Marquis | G06F 17/30961 707/744 |
| 2004/0133590 A1 | * | 7/2004 | Henderson | G06F 17/30327 |
| 2007/0107057 A1 | * | 5/2007 | Chander | G06F 21/54 726/22 |
| 2009/0214031 A1 | * | 8/2009 | Jin | G09C 5/00 380/200 |

* cited by examiner

*Primary Examiner* — Mohammed Waliullah
(74) *Attorney, Agent, or Firm* — Staas & Halsey LLP

(57) ABSTRACT

A method of analyzing a program code of an electronic device includes configuring a tree by using a key string included in the program code and; in response to a command to find a specific key being received, performing a predetermined order traversal of the tree by using a string included in the specific key; in response to a node which matches a last string included in the specific key having a leaf node as a result of the predetermined order traversal, returning a value of the leaf node; and analyzing the program code by using the return value.

17 Claims, 21 Drawing Sheets

FIG. 5A

| Key | Value |
|---|---|
| PhoneSmsService | Serve |
| PhoneSmsMessage | Msg |
| PhoneNumber | 012-345-6789 |
| PhoneLog | sms Send |

FIG. 6B

| Operation | Result |
|---|---|
| Add("PhoneSmsMessage", "Data") | Phone Sms → Service → Serve; Message → Msg; Data |
| Add("PhoneSmsLog", "newLog") | Phone Sms → Service → Serve; Message → Msg; Data; Log → new Log |
| Add("PhoneSms*", "SomeThing") | Phone Sms → * → Serve; Msg; Data; new Log; SomeThing |

FIG. 9A

```
Function f1{
    var a = 0;
    Function f2{
        var b = 1;
        Function f4{
            var c = 4;
        }
    }

Function f3{
        var d = 3;
        Function f5{
            var e = a;
        }
    }
}
```

FIG. 12B

| |
|---|
| f1.a = 0; |
| f1.f2.b = 1; |
| f1.f2.f4.c = 4; |
| f1.f2.d = 3; |
| f1.f2.f5.e = f1.a; |

METHOD FOR ANALYSING PROGRAM CODE OF ELECTRONIC DEVICE AND ELECTRONIC DEVICE

CROSS-REFERENCE TO RELATED APPLICATIONS

This application claims the priority benefit of Korean Patent Application No. 10-2014-0048925, filed in the Korean Intellectual Property Office on Apr. 23, 2014, the disclosure of which is incorporated herein by reference.

BACKGROUND

1. Field

The following description relates to a method of analyzing a program code of an electronic device, and an electronic device using the method.

2. Description of the Related Art

A web application is mostly formed of combination of HTML and script languages such as Javascript. HTML is used to constitute a UI component, and a script language is used to implement operations of applications.

In most cases, a conventional script language has been used only for limited purposes such as decorating web pages or simple handling of events. Even when an error occurs, no particular problem has occurred, and the size of implemented code has not been not large. Accordingly, there has been no high demand for an elaborate analysis method.

However, recently, along with widespread usage of a smart device, the amount of web applications which are prepared by using script languages has increased in order to implement platform-independent web applications. In addition, complexity and a size of implemented web applications have also increased. Consequently, demand for an analyzer of an application which is developed using script language is also on the rise.

Particularly, a smart device processes personal information considering its properties. Recently, due to the appearance of malicious applications which leak out personal information, the necessity for a technique for analyzing malicious applications draws attention.

SUMMARY

Additional aspects and/or advantages will be set forth in part in the description which follows and, in part, will be apparent from the description, or may be learned by practice of the disclosure.

An aspect of the exemplary embodiments relates to, in case of performing static or dynamic analysis of a program code, an electronic device for improving analysis performance by improving a storing structure of a program code, and a method for analyzing a program code of an electronic device.

According to an exemplary embodiment, a method of analyzing a program code of an electronic device may include configuring a tree by using a key string included in the program code and in response to a command to find a specific key being received, performing a predetermined order traversal of the tree by using a string included in the specific key, in response to a node which matches a last string included in the specific key having a leaf node as a result of the predetermined order traversal, returning a value of the leaf node; and analyzing the program code by using the return value.

The returning may further include, in response to a child node of a node which matches a last string included in the specific key not being a leaf node as a result of the predetermined order traversal, returning values of all leaf nodes which are capable of being reached to a sub level from the node which matches the last string.

The returning may further include, in response to a node which matches a string included in the specific key not being present in the predetermined order traversal process, returning a finding failure.

The method may further include storing the return value.

The method may further include, in response to a node which matches some strings included in the specific key being present, generating a new child node of a last node which matches a string included in the specific key, and storing the other strings of the specific key in the generated child node, and generating a leaf node of the generated child node, and storing a value of the specific key in the generated leaf node.

The method may further include, in response to no node which matches a string included in the specific key being present, generating a new child node of a root node of the tree, and storing a string of the specific key in the generated child node, and generating a leaf node of the generated child node, and storing a value of the specific key in the generated leaf node.

The method may further include, in response to a command to delete a second key being received, performing a predetermined order traversal of the tree, and in response to a node which matches a last string included in the second key having a leaf node as a result of the predetermined order traversal, deleting a node located on a path of the predetermined order traversal and the leaf node.

The method may further include, in response to a node which matches a last string included in the second key not having a leaf node as a result of the predetermined order traversal, returning a deletion failure.

The method may further include, in response to a node which matches at least some of strings included in the second key not being present as a result of the predetermined order traversal, returning a finding failure.

According to an exemplary embodiment, a method of analyzing a program code of an electronic device may include sequentially reading the program code, in response to new function definition being read in the reading process, renewing scope information, and in response to new variable assignment being read in the reading process, setting the variable to be in the scope.

The scope information may include an inclusion relation between a plurality of functions.

The analyzing may include, in response to an access to the variable being made, analyzing the program code with reference to a scope which is set for the variable.

According to an exemplary embodiment, a method of analyzing a program code of an electronic device may include repackaging an application and inserting a detection code, in response to the application being executed, analyzing whether the application performs a malicious activity, and in response to the application being determined to perform a malicious activity, outputting data.

The malicious activity may include transmitting privacy information of a user of the electronic device to an external device.

The outputting may include, in response to the application being determined to perform a malicious activity, outputting an alarming message.

The outputting may include, in response to the application being determined to perform a malicious activity, stopping an operation of the application.

According to an exemplary embodiment, an electronic device which includes a tree configuration unit configured to configure a tree by using a key string included in the program code and, a tree traversal unit configured to, in response to a find command on a specific key being received, perform a predetermined order traversal of the tree by using a key string included in the specific key, and in response to a node which matches a last string included in the specific key having a leaf node as a result of the predetermined order traversal, return a value of the leaf node, and a code analyzer configured to analyze the program code by using the return value.

The tree traversal unit, in response to a child node of a node which matches a last string included in the specific key not being a leaf node as a result of the predetermined order traversal, may return values of all leaf nodes which are capable of being reached to a sub level from the node which matches a last string.

The tree traversal unit, in response to a node which matches a string included in the specific key not being present in the predetermined order traversal process, may return a finding failure.

The tree configuration unit, in response to a node which matches some strings included in the specific key being present, may generate a new child node of a last node which matches a string included in the specific key, and store the other strings of the specific key in the generated child node, and generate a leaf node of the generated child node, and stores a value of the specific key in the generated leaf node.

The tree configuration unit, in response to a node which matches a string included in the specific key not being present, may generate a new child node of a root node of the tree, and store a string of the specific key in the generated child node, and generate a leaf node of the generated child node, and storing a value of the specific key in the generated leaf node.

The tree traversal unit, in response to a command to delete a second key being received, may perform a predetermined order traversal of the tree, and in response to a node which matches a last string included in the second key having a leaf node as a result of the predetermined order traversal, delete a node located on a path of the predetermined order traversal and the leaf node.

The tree traversal unit, in response to a node which matches a last string included in the second key not having a leaf node as a result of the predetermined order traversal, may return a deletion failure.

The tree traversal unit, in response to a node which matches at least some of strings included in the second key not being present as a result of the predetermined order traversal, returning a deletion failure.

As described above, according to various exemplary embodiments, in case of performing static or dynamic analysis of a program code, the following description relates to an electronic device for improving analysis performance by improving storing structure of a program code, and a method for analyzing a program code of an electronic device.

BRIEF DESCRIPTION OF THE DRAWINGS

The above and/or other aspects of the disclosure will be more apparent by describing certain exemplary embodiments of the disclosure with reference to the accompanying drawings, in which:

FIGS. 5A, 5B, 6A, 6B, 7A, and 7B are drawings illustrating an exemplary embodiment of configuration of a tree and tree traversal;

FIG. 9A is a drawing illustrating an exemplary program code;

FIG. 12B is a drawing illustrating a setting environment or an abstracted code corresponding to FIG. 12A;

DETAILED DESCRIPTION

Figure 1:
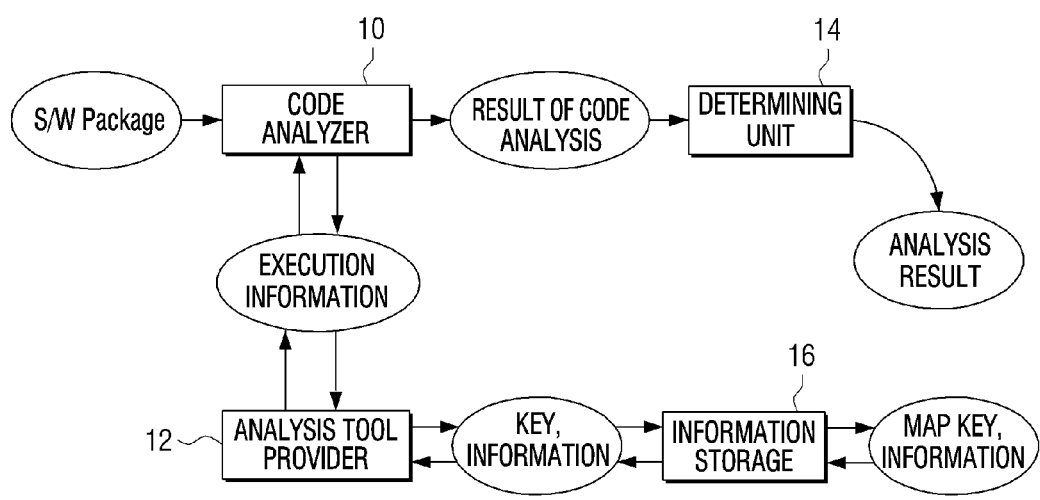
FIG. 1 is a block diagram illustrating a configuration of electronic device for analyzing a program code.

Reference will now be made in detail to the embodiments, examples of which are illustrated in the accompanying drawings, wherein like reference numerals refer to like elements throughout. The embodiments are described below to explain the present disclosure by referring to the figures.

The exemplary embodiments may vary, and may be provided in different exemplary embodiments. Specific exemplary embodiments will be described with reference to accompanying drawings and detailed explanation. However, this does not necessarily limit the scope of the exemplary embodiments to a specific embodiment form. Instead, modifications, equivalents and replacements included in the disclosed concept and technical scope of this specification may be employed. While describing exemplary embodiments, if it is determined that the specific description regarding a known technology obscures the gist of the disclosure, the specific description is omitted.

Hereinafter, an exemplary embodiment will be described in detail with accompanying drawings. FIG. 1 is a block diagram illustrating a configuration of an electronic device for analyzing a program code.

Referring to FIG. 1, an electronic device 100-1 includes a code analyzer 10, a determination unit 14, an analysis tool provider 12, and information storage 16.

The code analyzer 10 receives an analysis tool from the analysis tool provider 12 and performs code analysis on a software package.

The analysis tool provider 12 reads a key stored in the information storage 16 and information corresponding to the key and provides the key and the corresponding information as an analysis tool. The key and the corresponding information are mapped and then stored in the information storage 16. That is, a key and a value which is mapped to the key which constitutes a program code may be stored in the information storage 16. For example, if an object named PhoneSmsService has a value "Serve," information, PhoneSmsService=Serve, is stored.

The code analyzer 10 may perform dynamic code analysis if a program code is being executed, and perform static code analysis before a program code is executed. The code analyzer 10 analyzes operations of objects which constitute a program code. For instance, the code analyzer 10 may analyze whether a specific function of a program code calls a certain system call, and what a corresponding parameter value is.

The determination unit 14 receives an analysis result from the code analyzer 10, interprets and outputs the meaning of the analysis result. For instance, it has been analyzed that a specific parameter indicating personal privacy information has been transmitted to an external device, the determination unit may determine that the information has been leaked and inform a user of the leakage of the information. In addition, the determination unit may determine whether an access to a specific parameter has been made based on permission.

Hereinafter, an electronic device which can perform static or dynamic analysis of a program code will be explained in further detail, according to various exemplary embodiments.

Figure 2:
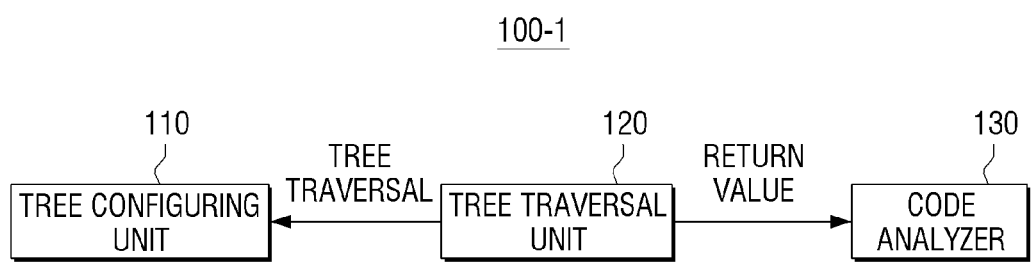
FIG. 2 is a block diagram illustrating a configuration of an electronic device according to an exemplary embodiment.
Figure 3:
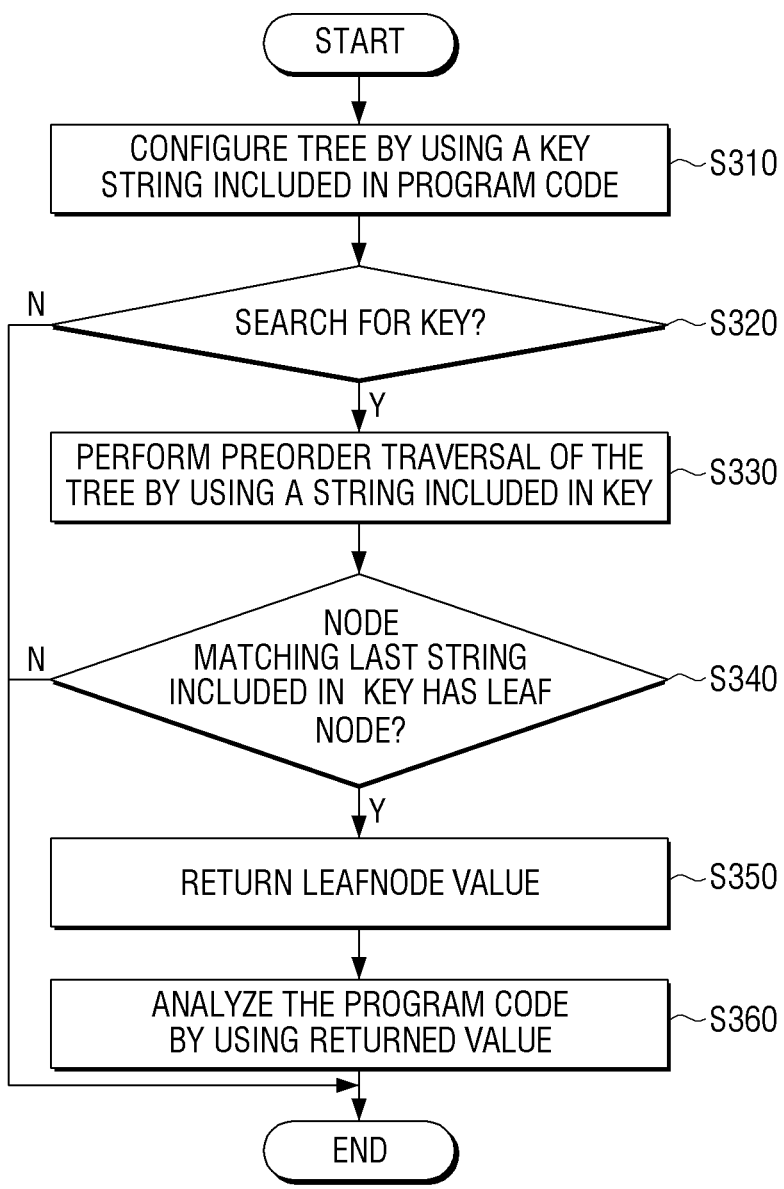
FIGS. 3 and 4 are flow charts illustrating a method of analyzing a program code of an electronic device according to an exemplary embodiment.
Figure 4:
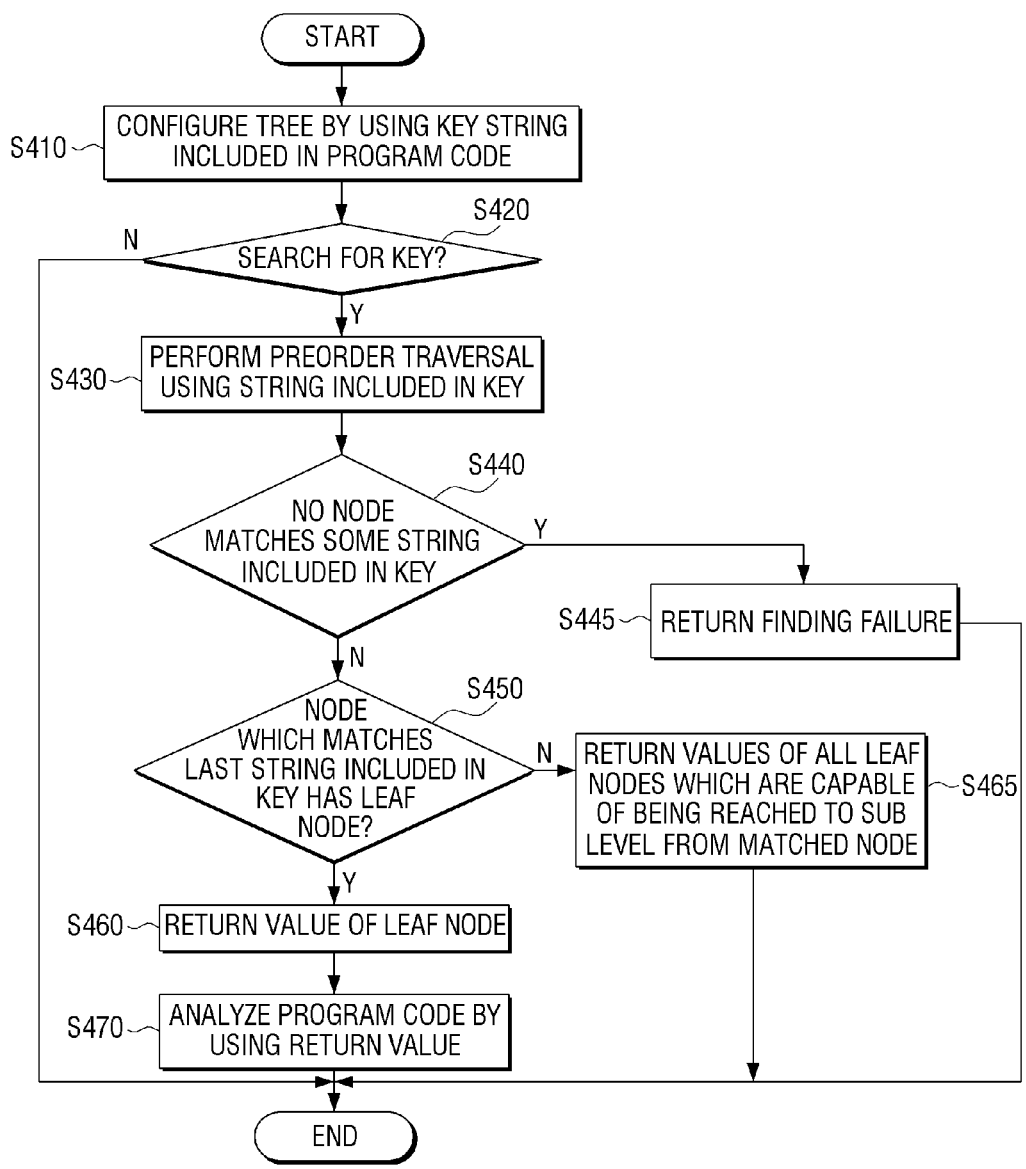

FIG. 2 is a block diagram illustrating a configuration of an electronic device 100-1 according to an exemplary embodiment, and FIGS. 3 and 4 are flow charts illustrating a method of analyzing a program code of an electronic device according to an exemplary embodiment.

Referring to FIG. 2, the electronic device 100-1 according to an exemplary embodiment includes a tree configuration unit 110, a tree traversal unit 120, and a code analyzer 130.

The electronic device 100-1 according to FIG. 2 may statically analyze a program code. A static analysis technique is a technique of analyzing a program code before or after running a program. According to static analysis technique, each variable or function has to maintain its value at one point of a program, and the value information can be maintained in a key-value form. In language analysis of a compiler language such as C language or java language, data can be managed effectively by the above-described analysis method and static analysis can be performed using the method. However, in a script language such as Javascript, an access to a function or a variable through string combination is permitted, and thus far more efficient data management method can be considered, compared with a mapping method in a key-value form.

Here, the script language is a language which can be executed without compiling, and if the script language is prepared in an html code, a web browser interprets the script language line by line and then executes the interpreted script language. Unlike a language which has to go through a compiling process such as a conventional C/C++, java, etc., a script language does not need a compiling process and thus provides flexible grammar which allows simple operations to be easily defined ad then be used. In addition, because the script language does not go through a compiling process, the script language is not platform-dependent and is widely used in implementing a web application.

As shown above, in a script language, a key string which is included in a program code can be used more widely compared with a key-value method. Above all, the tree configuration unit 110 configures a tree using a key string included in a program code (operation S310, operation S410). A tree is configured in a way that a new node is added to a tree, of which an explanation will follow.

The tree traversal unit 120, if a find command for a specific key is received (operation S320-Y, operation S420-Y), performs a predetermined order traversal of the tree by using strings included in the specific key (operation S330, operation S430). Here, the term "perform a predetermined order traversal of a tree" refers to a tree traversed in a way that a value of each node is checked (compared) first, and then a child node of the tree is visited. If a node of the tree has a plurality of child nodes, nodes are sequentially visited, starting from a child node on the far left, which is the closest in terms of index.

The tree traversal unit 120 searches for a plurality of strings which are included in a specific key and differentiated from one another, starting from the left side. For instance, if a specific key is composed of strings A, B, and C, the tree traversal unit 120 searches for a node corresponding to the string A first and then searches for nodes in an order of B and C.

As a result of the predetermined order traversal, if a node which matches a last string included in the specific key has a leaf node (operation S340-Y, operation S450-Y), the tree traversal unit 120 returns a value of the leaf node (operation S350, operation S460). According to the above described example where a key is ABC, if a node matching C has a leaf node, the tree traversal unit 120 returns the value of the leaf node.

The code analyzer 130 analyzes the program code by using the return value (operation S360, operation S470). For example, if the return value of the leaf node is a parameter for transmitting location information of an electronic device to other devices, the electronic device may indicate the information on a display.

The tree traversal unit 120, if no node matching a string included in the specific key exists in the predetermined order traversal processing (operation S440-Y), returns a "finding failure" (operation S445). A case where there exists no node matching a string included in the specific key refers to a case where at least some of all strings included in a specific key have not been found in a tree. For example, in the above described exemplary embodiment, a case where, in a key composed of strings A, B, and C, only A and B have been found, or none of A, B and C has been found falls into the above described case.

In this case, because no string included in the specific key has been found, it can be determined that the specific key does not exist in the tree. Thus, the tree traversal unit 120 returns a "finding failure" (operation S445).

If the node matching a last string included in the specific key does not have a leaf node (operation S450-Y), that is, a child node of the node matching a last string is not a leaf node, the tree traversal unit 120 returns the values of all the leaf nodes that can be reached (visited) to a subordinate level from the last matched node (operation S465). In the above-described exemplary embodiment, it is assumed that C is a last node which matches a string. If a child node of the node which matches C is not a leaf node, values of all the leaf nodes that can be reached to a sub level from the last matched node are returned. For instance, if a node which matches C has two child nodes, D and E, and D and E respectively have a leaf node, values of the leaf nodes of D and E are returned respectively.

The code analyzer 130 may store the return values in the storage.

As described above, the tree configuration unit 110 may configure a tree. Here, the above described method of traversing a tree is applied to configure a tree. That is, if a specific key and a value which matches the specific key are given and there is a control command to add the specific key and its matching value to a tree, the tree traversal unit 120 performs a predetermined order traversal of the tree in order to determine whether the specific key exists in the tree.

As a result of the predetermined order traversal, if a node which matches the last string included in the specific key has a leaf node, the value of the specific key is stored in the leaf node, together with the value of the leaf node.

In contrast, as a result of the predetermined order traversal, if a node which matches the last string included in the specific key does not have a leaf node, a leaf node of the lastly match node is generated, and the value of the specific key value is stored in the generated leaf node.

Cases where a node which matches a string included in the specific key does not exist in a predetermined order traversal process fall into the following two cases.

First, if a node which matches some of the strings included in the specific key exists, the tree configuration unit 110 generates a new child node of the last node which matches a string included in the specific key, and stores the other strings of the specific key in the generated child node. Then, the tree configuration unit generates a leaf node of the generated child node, and stores the value of the specific key in the generated leaf node. If a plurality of strings included in the specific key do not match a node of the tree, the tree configuration unit generates nodes which respectively match all strings, in a manner that a child node (grandchild node) of the generated child node is generated, and stores the value of the specific key by generating a leaf node of the terminal node.

Meanwhile, if there exists no node which matches a string of the specific key, the tree configuration unit generates a new child node of a root node of the tree and stores the strings of the specific key in the generated child node. If a plurality of strings are included in the specific key, the tree configuration unit generates subnodes in a manner that a child node generates its child node (grandchild node), and after the tree configuration unit generates a leaf node of a terminal node, the tree configuration unit stores the value of the specific key in the generated leaf node.

A node can be removed in the same manner as a node is searched for or added. That is, if a specific key is given and there is a control command to remove the specific key, the tree traversal unit 120 performs a predetermined order traversal of the tree to determine whether the specific key exists in the tree. If a tree has been configured already, the specific key may be a second key. Node removal can be performed by the tree traversal unit 120.

As a result of the predetermined order traversal, if a node which matches a last string included in the specific key has a leaf node, the tree traversal unit 120 removes the node located on the path of the predetermined order traversal and the leaf node.

As a result of the predetermined order traversal, if a node which matches a last string included in the specific key does not have a leaf node, a removal failure is returned. This occurs when a tree traversal is terminated in the middle of the tree. That is because, if all of matched nodes are removed, other nodes which are connected to the matched nodes are affected.

In a similar manner, the tree traversal unit 120, if there exists no node which matches at least some of strings included in the specific key as a result of the predetermined order traversal, returns removal failure.

Meanwhile, the electronic device 100-1 includes a common configuration of a common electronic calculation device. That is, the electronic device 100-1 may include hardware configuration of a mass auxiliary memory device such as a CPU, cache memory, RAM memory, hard disk and blue ray disk having sufficient control and calculation capacity; various types of wired and wireless communication module such as input/output device such as a touch screen, short distance communication module and HDMI; data bus, etc. Also, the electronic device 100-1 includes an application, a framework, and operating system which can perform functions of the above-described tree configuration unit 10, the tree traversal unit 120 and a code analyzer 130.

Also, the electronic device 100-1 may be implemented as various mobile devices or stationary devices. For example, the electronic device 100-1 may be implemented as at least one of a smartphone, tablet PC, smart watch, smart glasses, PMP, MP3 player, PDA, cell phone, laptop computer, other mobile terminal device, and work station.

FIGS. 5A to 7B are drawings illustrating exemplary embodiments of configuration of a tree and tree traversal.

FIG. 5A illustrates a table composed of keys and key values. As shown in FIG. 5A, a specific key has its unique key value. For instance, PhoneSmsMessage has a value, Msg.

Figure 5B:
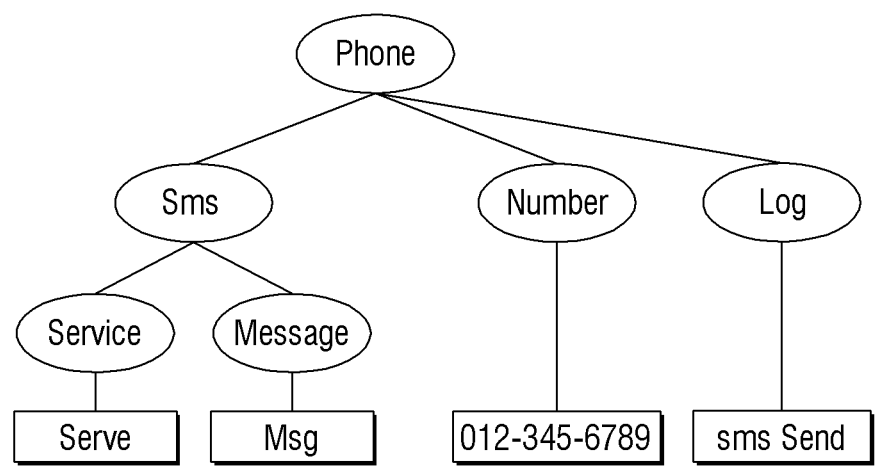

FIG. 5B illustrates an exemplary embodiment where a key-value table is configured as a tree. The tree configuration unit 110 configures a tree as shown in FIG. 5B. A tree root is formed of a first string which keys share in common. Key values are stored in terminal leaf nodes in a tree path.

Based on FIG. 5B, return values can be predicted when a search operation is performed in a tree.

For example, in response to an arithmetic operation, Find ("PhoneSmsMessage"), of returning a key value of PhoneSmsMessage, the tree traversal unit divides the key into three strings, "Phone", "Sms", and "Message" to determine the key. The tree traversal unit compares and goes down the nodes according to a predetermined order traversal, starting from a root. The tree traversal unit ultimately searches for a node which matches Message, and because the last matching node has a leaf node, the value of the leaf node, "Msg", is returned.

In case of an arithmetic operation of returning a key value of PhoneSms, the tree traversal unit 120 divides the PhoneSms into "Phone" and "Sms" to determine the key. The last matching node does not have a leaf node. Accordingly, both of a value of the leaf node of the node which matches Service and a value of the leaf node of the node which matches Message are returned. That is, "Serve", and "Msg" are returned.

By comparison, in case of arithmetic operation of returning a key value of PhoneSmsServiceHistory, the tree traversal unit 120 divides PhoneSmsServiceHistory into four strings, "Phone", "Sms", "Service", and "History" to determine the key, PhoneSmsServiceHistory. Because "History", one of the strings, cannot be found, a finding failure is returned.

Figure 6A:
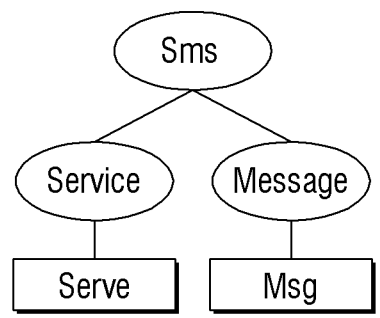

FIG. 6B illustrates an exemplary embodiment where a new key value is inserted to a tree of FIG. 6A.

For example, if a value, "Data" should be inserted into a key, PhoneSmsMessage, in a tree, strings, "Phone", "Sms", and "Message" are compared first in performing a tree traversal. The node matching the last string has a leaf node, the "Data" is added to the leaf node.

If "new Log" is added to "PhoneSmsLog", the tree is traversed, comparing strings, "Phone", "Sms", and "Log", and because there exists a node matching some of strings included in the key, the tree configuration unit 110 generates a child node of a last node which matches a string included in the specific key, and add "Log", a string which does not match any node, to a child node. Then, a leaf node of the child node is generated to add a key value "new Log".

In a special case, all nodes such as "PhoneSms*" may be designated. If a key value is "SomeThing", "*" node is placed below the roof node "PhoneSms", and a leaf node having all the key values may be configured below the "*" node.

Figure 7A:
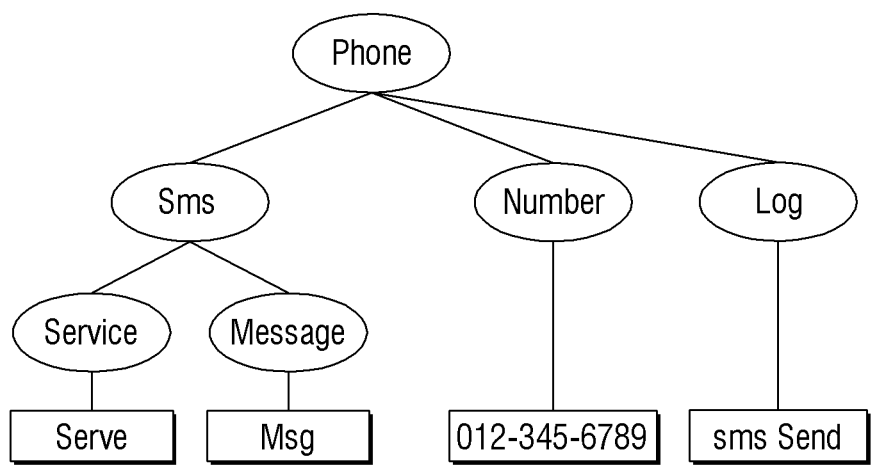
Figure 7B:
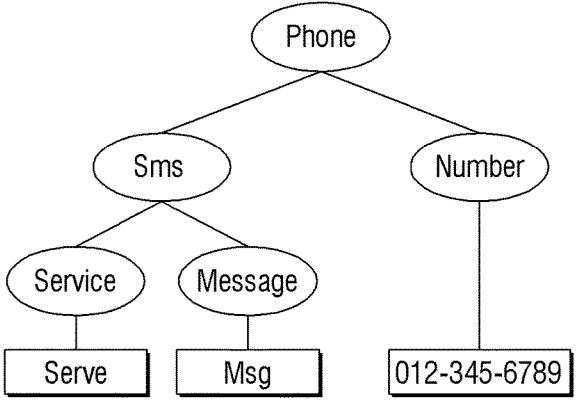

FIG. 7B illustrates an exemplary embodiment where a tree key illustrated in FIG. 7A is deleted.

If a key "PhoneLog" is to be deleted in a tree in FIG. 7A, the tree traversal unit 120 performs searching first, traversing the tree. Because the last string "Log" has a leaf node, "Log", which is a node located on the path of the predetermined order traversal, and "sms Send", the leaf node, are deleted. It should be noted that the root node is not deleted.

However, if "PhoneSmsLog" is to be removed, a predetermined order traversal is performed, and because there exists no node matching one of the string, "Log", as a result of the predetermined order traversal, a removal failure is returned.

Also, if "PhoneSms" is to be removed, a predetermined order traversal is performed, and because a node matching the last string "Sms" does not have a leaf node as a result of the predetermined order traversal, a removal failure is returned.

Figure 8A:
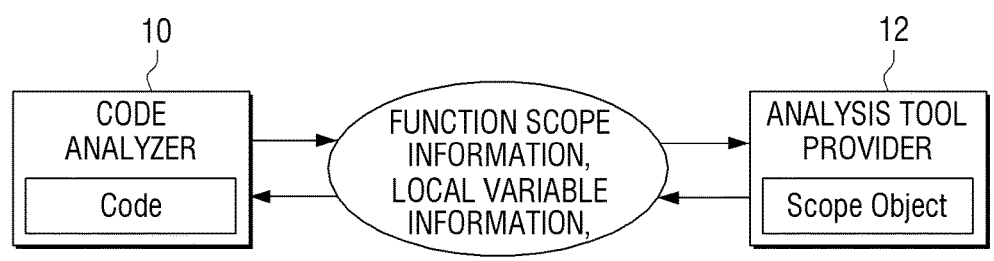
FIGS. 8A and 8B are drawings illustrating code analysis using a scope object.
Figure 8B:
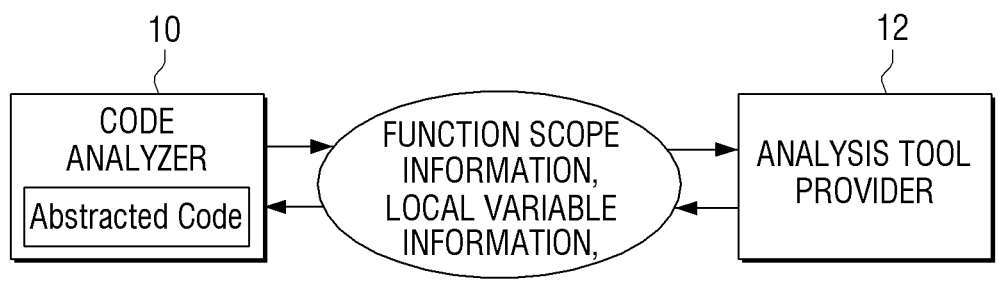

FIGS. 8A and 8B are drawings illustrating code analysis which uses a scope object.

Javascript language defines a data management method named a scope object in order to manage assignment scope of variables. There are many cases where assignment scope of variables needs to be identified in order to analyze a program code. There is a problem that scope object of Javascript is complicated and makes the calculation slow. Thus, a method for simplifying the scope object of Javascript and improving performance in analysis is needed.

As illustrated in FIG. 8A, the code analyzer 10 transmits and receives Function Scope information and Local Variable information to and from the analysis tool provider 12.

According to an exemplary embodiment of the disclosure, as illustrated in FIG. 8B, the code analysis unit 10 may change a scope object to an abstracted code to be stored. Thus, the analysis tool provider 12 does not have to separately manage a scope object.

Figure 9B:
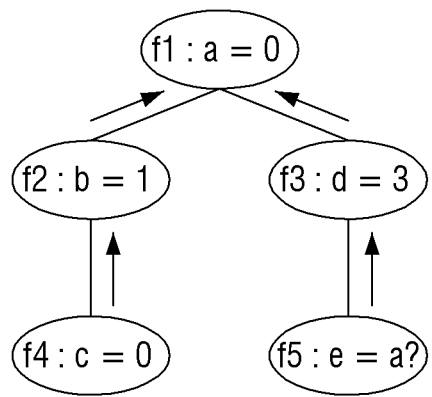
FIG. 9B is a drawing illustrating a scope object.

FIG. 9A is a drawing illustrating an exemplary program code, and FIG. 9B is a drawing illustrating a scope object.

According to Javascript, the analysis tool provider 12 manages the program code of FIG. 9A as a scope object as shown in FIG. 9B. The uppermost level function, f1, includes sub functions f2 and f3, and f2 and f3 include f4 and f5 respectively. If a new function is defined, a new element is added to a stack, and link information on an upper level scope is added. If a new local variable appears in the function, the new local variable is recorded together with a function of a level which corresponds to the local variable information. If the structure is traced back based on a link, the structure has data structure in a tree form as in FIG. 9B, and if a variable which is not defined in the current function is found during the code analysis, the tree is traced back to search for specification regarding the corresponding variable. This method has an advantage that code can be analyzed, while simulating an execution of Javascript as it is, but has disadvantage that an analysis cost is incurred to traverse a tree.

Figure 10:
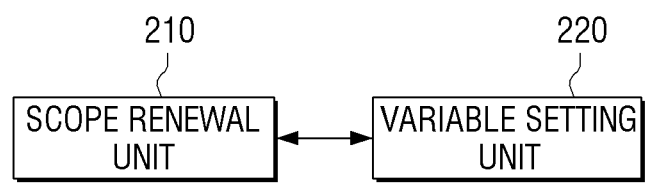
FIG. 10 is a block diagram illustrating a configuration of an electronic device according to an exemplary embodiment.
Figure 11:
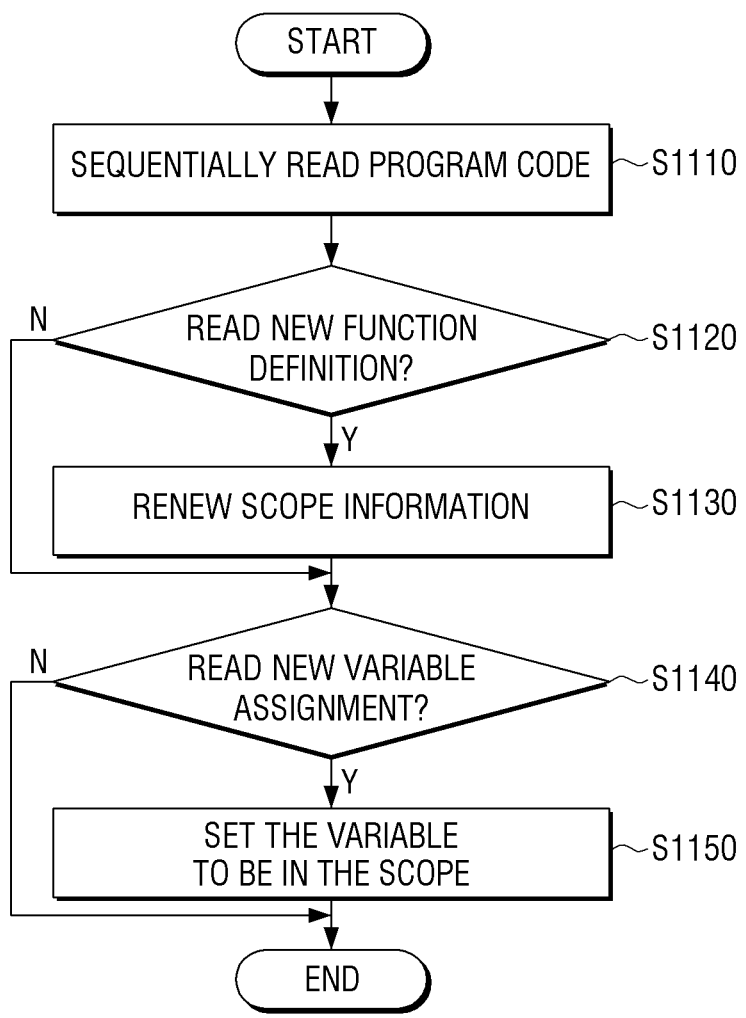
FIG. 11 is a flowchart illustrating a method of analyzing a program code according to an exemplary embodiment.

FIG. 10 is a block diagram illustrating a configuration of an electronic device 100-2 according to an exemplary embodiment, and FIG. 11 is a flowchart illustrating a program code analysis method according to an exemplary embodiment.

Referring to FIG. 10, an electronic device 100-2 according to an exemplary embodiment includes a scope renewal unit 210 and a variable setting unit 220.

The scope renewal unit 210 sequentially reads a program code (operation S1110), and if the scope renewal unit reads a new function definition during the reading process (operation S1120-Y), the scope renewal unit renews scope information (operation S1130).

If a new variable assignment is read (operation S1140-Y) during the reading process, the variable setting unit 220 sets that the variable to be in the scope (operation S1150). That is, if a variable declaration is met during the reading process, the scope information is added to the setting environment. If an access to the variable is made during the analysis process, scope information on the variable is found in the setting environment to perform analysis.

The above described method provides the function of maintaining an object without spending a cost to maintain an object. That is, when an access to a variable is made, no time is needed for searching a scope object.

Figure 12A:
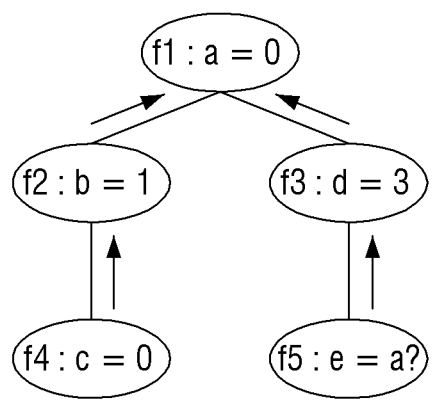
FIG. 12A is a drawing illustrating a scope object.

FIG. 12A is a drawing illustrating a scope object, and FIG. 12B illustrates a setting environment or an abstracted code corresponding to FIG. 12A.

FIG. 12A illustrates a scope object corresponding to FIG. 9A. From FIG. 12A, it can be understood that a tree is formed in a hierarchical fashion. If a new function f2 is read while a code is read, scope information is renewed and the renewed information is recorded as shown in f1 and f2, thereby expressing path and hierarchy. If a new variable assignment b=1 is read in the reading process, the variable setting unit 220 sets that the variable b has the scope f1 and f2. As a result, the abstracted code is recorded as follows: f1.f2.b=1. By the above described method, an abstracted code or environment can be set, and the above information is used in code analysis. That is, if an access to the variable is made, the program code is analyzed with reference to a scope which is set for the above variable.

Hereinafter, an exemplary embodiment of dynamic program code analysis according to an exemplary embodiment will be explained. A dynamic program code analysis method according to an exemplary embodiment provides a method of detecting in real time a malicious activity of a program which occurs while a user executes a web application.

Figure 13:
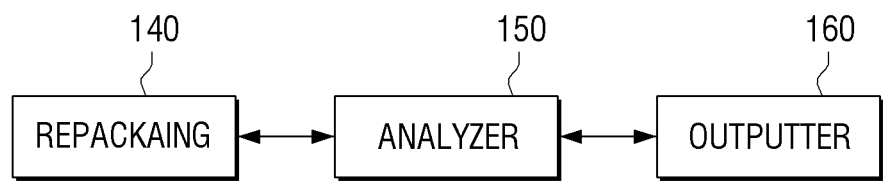
FIG. 13 is a block diagram illustrating a configuration of an electronic device according to an exemplary embodiment.
Figure 14:
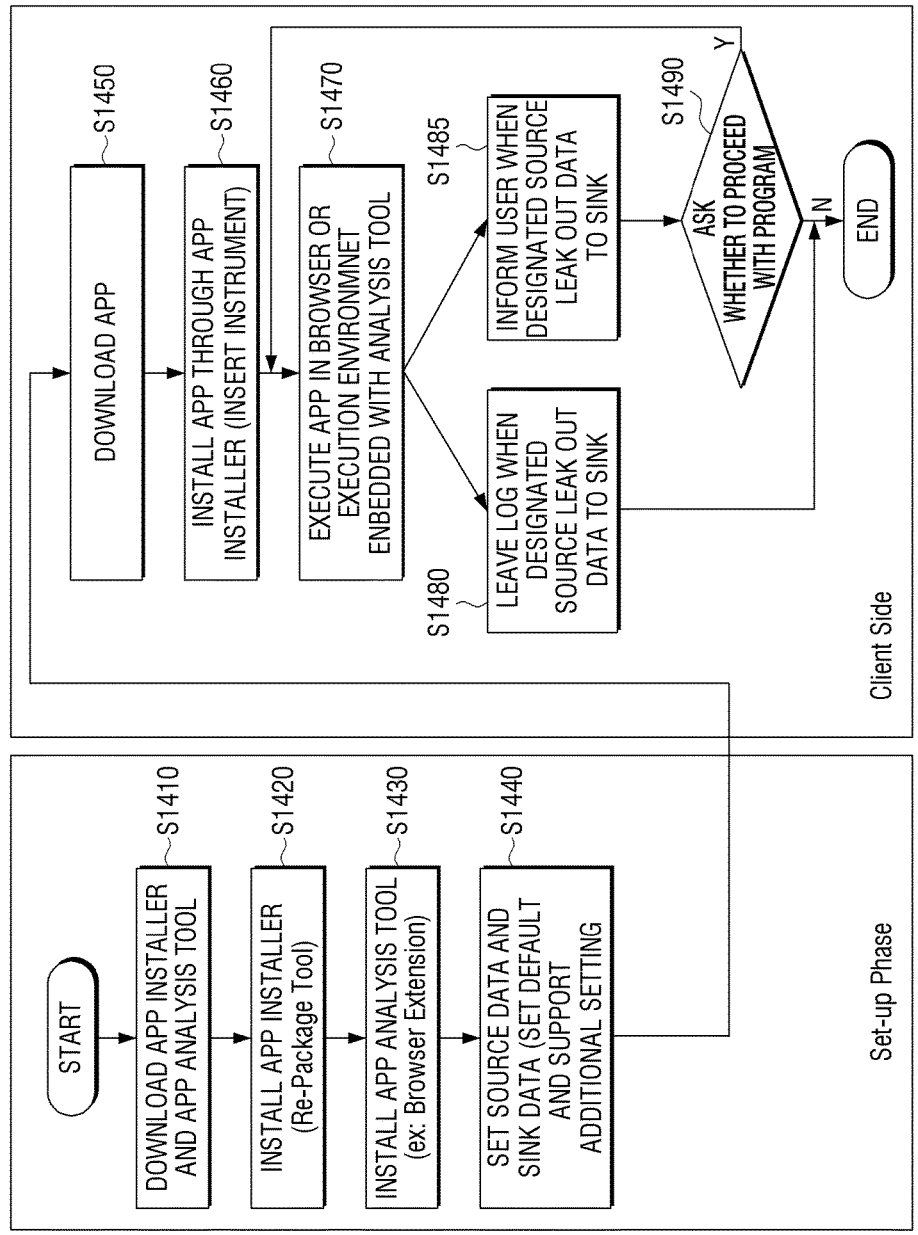
FIGS. 14 and 15 are flowcharts illustrating a method of analyzing a dynamic program code analysis according to an exemplary embodiment.
Figure 15:
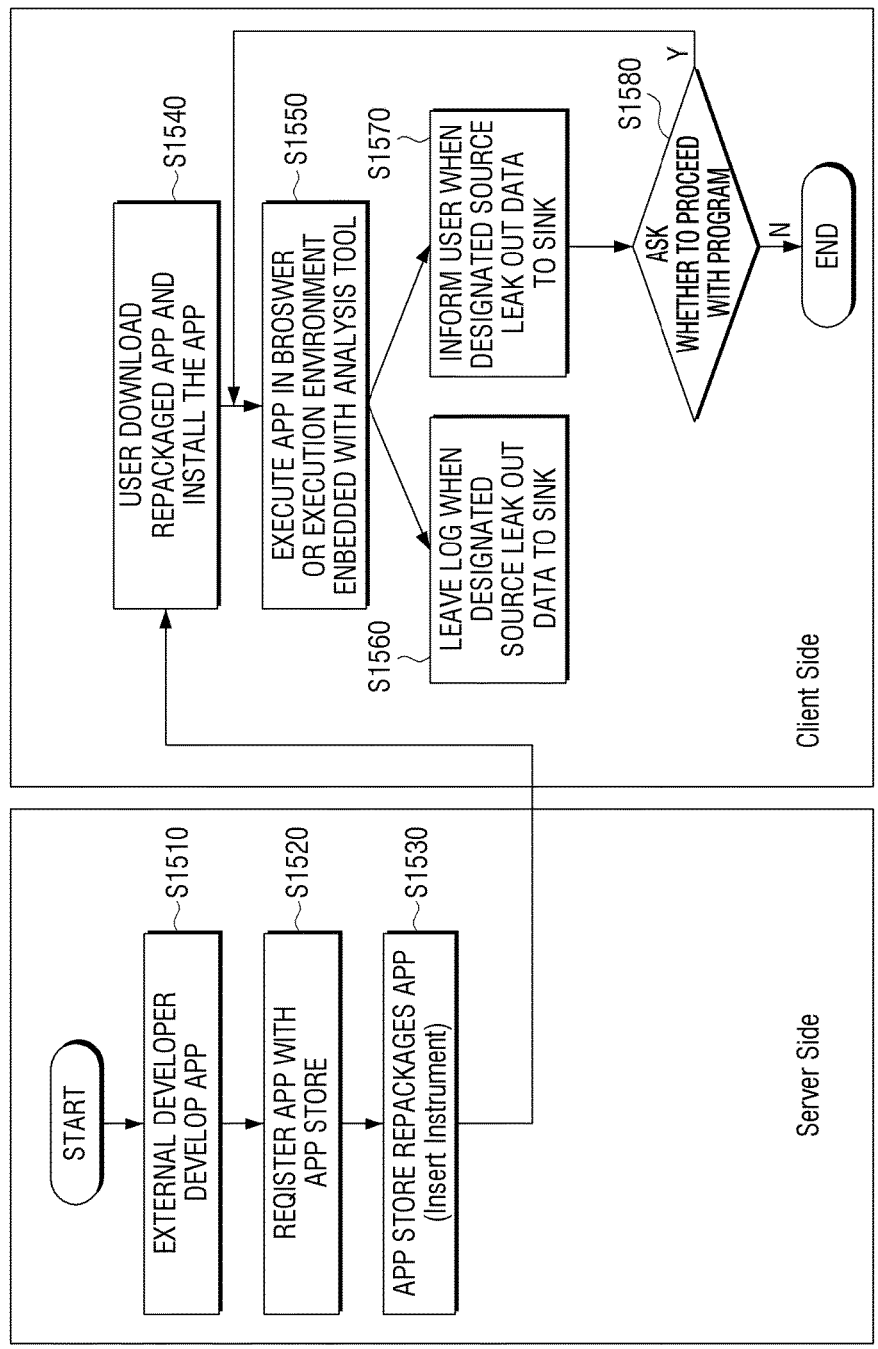

FIG. 13 is a block diagram illustrating configuration of an electronic device 100-3 according to an exemplary embodiment, and FIGS. 14 and 15 illustrate dynamic program code analysis according to an exemplary embodiment.

Referring to FIG. 13, an electronic device 100-3 according to an exemplary embodiment includes a repackaging unit 140, an analyzer 150, and an outputter 160.

The repackaging unit 140 is a unit for repackaging an application. An application may be downloaded from an external server. In this case, the repackaging unit repackages the application. The repackaging unit 140 may also repackage an application by a user input.

During the repackaging process, the electronic device 100-3 may define a malicious activity of an application and define an operation of an electronic device 100-3 performed in a case where the malicious activity occurs. For instance, if it is determined that an application transmits privacy information to an external device, a command to record log data on the transmission of privacy information or indicate a notice informing on a display that privacy information is leaked may be inserted into the application. The repackaging unit 140 may define privacy information. For example, the privacy information may be bank account number, a telephone number, ID/password, etc.

The repackaging unit 140 does not have to insert a code which corresponds to a malicious activity into an application. If the application is being executed, the repackaging unit 140 may be implemented as a real time monitoring process for monitoring in real time whether a malicious activity is occurring, together with the analyzer 150, which will be explained in further detail below.

The analyzer 150 analyzes whether a malicious activity occurs, if a program code is executed. The analyzer 150, if an application is executed, detects whether a defined malicious activity of an application occurs. A code which is included in an application by packaging, if a defined malicious activity occurs, can perform a predetermined activity for itself. For example, if an electronic device 100-3 leaks private data to an external device, the program code can leave log data. In this case, all that the analyzer 150 has to do is to determine whether a log message has been generated. If a predetermined activity as described above is not defined, the analyzer 150 determines whether a malicious activity occurs and controls the outputter 160, which will be described above, to output preset information.

The outputter 160 is a unit for performing, if the analyzer 150 finds a malicious activity or trace of malicious activity, a predetermined outputting operation. For instance, the outputter 160 may display an alarming message on a screen of an electronic device 100-3 to ask a user whether to proceed with an application program, and enable the operation of the application program to continue or stop according to a user response. Or, the outputter 160 may output an alarming sound or stop the operation of the application by force.

FIG. 14 is a flowchart illustrating a series of operations of an electronic device 100-3.

Referring to FIG. 14, an electronic device 100-3 downloads an installer and a program code analysis module (analyzer) from a server (operation S1410). Then, an installer is installed, and the installer includes a repackaging module (repackaging unit) (operation S1420). According to an exemplary embodiment, the analysis tool may be implemented as a web browser expansion function (operation S1430). And, the electronic device 100-3 sets source data and sink data (set default and support additional setting) (operation S1440).

The electronic device 100-3 may download an application (operation S1450), and the installer itself installs the downloaded application directly (operation S1460). In this case, the installer inserts a command code into the downloaded application. The electronic device 100-3 may define a malicious activity of an application and define an operation of an electronic device 100-3 performed in a case where the malicious activity occurs. For instance, if it is determined that an application transmits privacy information to an external device, an instruction to record log data on the transmission of privacy information or display a notice informing on a display that privacy information is leaked may be inserted into the application.

If a browser or an execution environment which includes an analysis module is executed (operation S1470), in case where a defined malicious activity of an application occurs, the defined operation of the electronic device 100-3 may be performed. In case where the electronic device (100-3: source device) leaks data to a sync device (external device), log data can be recorded (operation S1480). In case where the electronic device (100-3: source device) leaks out data to a sync device (external device), an alarming message can be displayed (operation S1485). In case where an alarming message is displayed to a user, whether to proceed with a program is asked (operation S1490), and program may proceed or stopped depending on a user response.

The above described repackaging may be performed by a download server itself. In this case, the repackaging unit 150 is included in a server.

FIG. 15 illustrates a dynamic analysis method used in case where repackaging occurs at a server.

Referring to FIG. 15, a developer develops an application first (operation S1510), and registers the application with an application selling server (app store) (operation S1520). Here, the selling server (app store) repackages an uploaded application (operation S1530). During the repackaging process, the selling server may define a malicious activity of an application and an operation of an electronic device performed in a case where the malicious activity occurs. For instance, if it is determined that an application transmits privacy information to an external device, an instruction to record log data on the transmission of privacy information or display a notice informing on a display that privacy information is leaked may be inserted into the application.

A user downloads a repackaged application and installs the repackaged application to the electronic device 100-3 (operation S1540), and the application is executed in a browser or an execution environment which includes an analysis tool (operation S1550). Here, in case where a defined malicious operation of an application occurs, a defined operation of an electronic device 100-3 is performed. In case where the electronic device (100-3: source device) leaks data to a sync device (external device), log data can be recorded (operation S1560). In case where the electronic device (100-3: source device) leaks out data to a sync device (external device), an alarming message can be displayed (operation S1570). In case where an alarming message is informed to a user, whether to proceed with the program is asked (operation S1580), and program may proceed or be stopped depending on a user response.

According to the above-described various exemplary embodiments, the present inventive step improves storage structure of a program code, thereby providing an electronic device for improving analysis performance and a method of analyzing a program code of an electronic device, in case of performing static or dynamic analysis of a program code.

The foregoing embodiments and advantages are merely exemplary and are not to be construed as limiting the present disclosure. The present teaching can be readily applied to other types of apparatuses. Also, the description of the exemplary embodiments of the disclosure is intended to be illustrative, and not to limit the scope of the claims, and many alternatives, modifications, and variations will be apparent to those skilled in the art.

The above-described embodiments may be recorded in computer-readable media including program instructions to implement various operations embodied by a computer. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be executed by the computer using an interpreter. The above-described devices may be configured to act as one or more software modules in order to perform the operations of the above-described embodiments, or vice versa.

Although a few embodiments have been shown and described, it would be appreciated by those skilled in the art that changes may be made in these embodiments without departing from the principles and spirit of the disclosure, the scope of which is defined in the claims and their equivalents.

What is claimed is:

1. A method of analyzing a program code of an electronic device, the method comprising:
    configuring a tree by using a key string included in the program code, wherein the tree has a root node based on a first string included in the key string, at least one child node based on a second or subsequent string included in the key string, and at least one leaf node that stores a key value for the key string;
    in response to receiving a command to find a specific key, performing a predetermined order traversal of the tree by using a string included in the specific key;
    in response to a node of said at least one child node which matches a last string included in the specific key having a leaf node of said the at least one leaf node as a result of the predetermined order traversal, returning a value of the leaf node; and
    analyzing the program code to determine whether the program code performs a malicious activity by determining whether the returned value is a system call with a corresponding parameter that indicates that privacy information is to be transmitted to an external device.

2. The method as claimed in claim 1, wherein the returning further comprises, in response to a child node of the node which matches the last string included in the specific key not being a leaf node as a result of the predetermined order traversal, returning values of all leaf nodes of said at least one leaf node which are capable of being reached to a sub level from the node which matches the last string.

3. The method as claimed in claim 1, wherein the returning further comprises, in response to the node which matches the string included in the specific key not being present in the predetermined order traversal process, returning a search failure.

4. The method as claimed in claim 3, further comprising:
    in response to a node which matches some strings included in the specific key being present, generating a new child node of a last node which matches a string included in the specific key, and storing the other strings of the specific key in the generated child node; and
    generating a leaf node of the generated child node, and storing a value of the specific key in the generated leaf node.

5. The method as claimed in claim 3, further comprising:
    in response to a node which matches a string included in the specific key not being present, generating a new child node of the root node of the tree, and storing a string of the specific key in the generated child node; and
    generating a leaf node of the generated child node, and storing a value of the specific key in the generated leaf node.

6. The method as claimed in claim 1, further comprising:
    in response to receiving a command to delete a second key, performing a predetermined order traversal of the tree, and
    in response to a node of said at least one child node which matches a last string included in the second key having a leaf node of said at least one leaf node as a result of the predetermined order traversal, deleting a node located on a path of the predetermined order traversal and the leaf node.

7. The method as claimed in claim 6, further comprising:
    in response to a node which matches a last string included in the second key not having a leaf node as a result of the predetermined order traversal, returning a deletion failure.

8. The method as claimed in claim 6, further comprising:
    in response to a node which matches at least some of strings included in the second key not being present as a result of the predetermined order traversal, returning a search failure.

9. A method of analyzing a program code of an electronic device, the method comprising:
    repackaging an application and inserting a detection code, wherein the repacking the application includes storing a key string in the program code of the application as a tree data structure having a root node based on a first string included in the key string, at least one child node based on a second or subsequent string included in the key string, and at least one leaf node that stores a key value for the key string;
    in response to the application being executed, analyzing whether the application performs a malicious activity based on a value of a leaf node of said at least one leaf node of a node of said at least one child node matching at least a portion of a specific key string by determining whether the value is a system call with a corresponding parameter that indicates that privacy information is to be transmitted to an external device; and
    in response to the application being determined to perform a malicious activity, performing at least one of recording log data on the malicious activity, outputting an alarming message, and stopping an operation of the application.

10. The method as claimed in claim 9, the performing comprises outputting an alarming message.

11. The method as claimed in claim 9, wherein the performing comprises stopping an operation of the application.

12. An electronic device comprising:
    at least one memory storing instructions; and
    at least one processor that executes the instructions to:
        configure a tree by using a key string included in the program code, wherein the tree has a root node based on a first string included in the key string, at least one child node based on a second or subsequent string included in the key string, and at least one leaf node that stores a key value for the key string;
        in response to receiving a find command on a specific key, perform a predetermined order traversal of the tree by using a string included in the specific key;

in response to a node of said at least one child node which matches a last string included in the specific key having a leaf node of said at least one leaf node as a result of the predetermined order traversal, return a value of the leaf node; and analyze the program code to determine whether the program code performs a malicious activity by determining whether the returned value is a system call with a corresponding parameter that indicates that privacy information is to be transmitted to an external device.

13. The device as claimed in claim 12, wherein the at least one processor executes the instructions to, in response to a child node of the node which matches the last string included in the specific key not being a leaf node as a result of the predetermined order traversal, return values of all leaf nodes of said at least one leaf node which are capable of being reached to a sub level from the node which matches the last string.

14. The device as claimed in claim 12, wherein the at least one processor executes the instructions to, in response to a node which matches a string included in the specific key not being present in the predetermined order traversal process, return a search failure.

15. The device as claimed in claim 14, wherein the at least one processor executes the instructions to, in response to a node which matches some strings included in the specific key being present, generate a new child node of the last node which matches the string included in the specific key, and store the other strings of the specific key in the generated child node, and generate a leaf node of the generated child node, and store a value of the specific key in the generated leaf node.

16. A method comprising:

storing a key string included in program code as a tree data structure having a root node based on a first string included in the key string, at least one child node based on a second or subsequent string included in the key string, and at least one leaf node that stores a key value for the key string;

receiving a command to find a specific key in the tree data structure;

searching the tree data structure in a predetermined order based on a string included in the specific key;

selectively returning a value of a leaf node of said at least one leaf node of a node of said at least one child node matching a last value in the string;

analyzing program code of an application in an electronic device using the returned value to determine whether the application performs a malicious activity by determining whether the returned value is a system call with a corresponding parameter that indicates that privacy information is to be transmitted to an external device; and if the application is determined to perform a malicious activity, providing a notification on the electronic device.

17. A non-transitory computer-readable recording medium storing a program to implement the method of claim 16.

* * * * *

UNITED STATES PATENT AND TRADEMARK OFFICE
CERTIFICATE OF CORRECTION

PATENT NO. : 9,773,114 B2  
APPLICATION NO. : 14/694459  
DATED : September 26, 2017  
INVENTOR(S) : Ji-soon Park et al.

Page 1 of 1

It is certified that error appears in the above-identified patent and that said Letters Patent is hereby corrected as shown below:

On the Title Page

Item (73), please add:  
Seoul National University R&DB Foundation of Seoul, Republic of Korea Signed and Sealed this  
Thirty-first Day of July, 2018

Andrei Iancu  
*Director of the United States Patent and Trademark Office*